United States Patent
Rapisarda

(10) Patent No.: US 7,856,214 B2
(45) Date of Patent: Dec. 21, 2010

(54) MOTION ACTIVATED CELL PHONE LIGHTING

(76) Inventor: Carmen Rapisarda, 21211 Wisteria St., Apple Valley, CA (US) 92308-7940

( * ) Notice: Subject to any disclaimer, the term of this patent is extended or adjusted under 35 U.S.C. 154(b) by 685 days.

(21) Appl. No.: 11/831,752

(22) Filed: Jul. 31, 2007

(65) Prior Publication Data

US 2009/0036156 A1 Feb. 5, 2009

(51) Int. Cl.
*H04B 1/38* (2006.01)
*H04K 3/00* (2006.01)

(52) U.S. Cl. .................. 455/90.3; 455/566; 455/567

(58) Field of Classification Search ........... 455/90.3, 455/566, 567; 340/7.55, 7.58, 7.6, 7.61
See application file for complete search history.

(56) References Cited

U.S. PATENT DOCUMENTS

| | | | |
|---|---|---|---|
| 5,239,691 A * | 8/1993 | Retzer et al. ............... | 455/90.3 |
| 5,758,267 A * | 5/1998 | Pinder et al. ............... | 455/90.2 |
| 5,809,123 A | 9/1998 | Reynolds | |
| 5,924,046 A | 7/1999 | Martensson | |
| 6,195,571 B1 * | 2/2001 | Osuge .................... | 340/7.58 |
| 6,292,674 B1 | 9/2001 | Davis | |
| 6,529,144 B1 | 3/2003 | Nilsen et al. | |
| 6,549,792 B1 | 4/2003 | Cannon et al. | |
| 6,600,937 B1 * | 7/2003 | Horngren ................. | 455/567 |
| 6,611,697 B1 | 8/2003 | Ewing | |
| 7,187,952 B2 | 3/2007 | Lin | |
| 2008/0030360 A1 * | 2/2008 | Griffin .................... | 340/689 |

* cited by examiner

*Primary Examiner*—Lee Nguyen
(74) *Attorney, Agent, or Firm*—Kenneth L. Green

(57) ABSTRACT

A cell phone includes at least one motion switch and circuitry to control cell phone functions when the cell phone is moved. In one embodiment, the motion switch activates keyboard backlighting. A single motion switch may be used or two motion switches may be positioned approximately orthogonally, for example, a first motion switch to activate on motion along the cell phone's length, and a second motion switch to activate on motion along the cell phone's width. One simple and inexpensive motion switch is a cantilevered spring, another is to monitor current produced by a vibrator motor already present in a cell phone. The cell phone according to the present invention with lighting activated by cell phone motion is particularly useful for locating a dropped cell phone, and even more useful for a vehicle operator searching for a dropped cell phone.

16 Claims, 2 Drawing Sheets

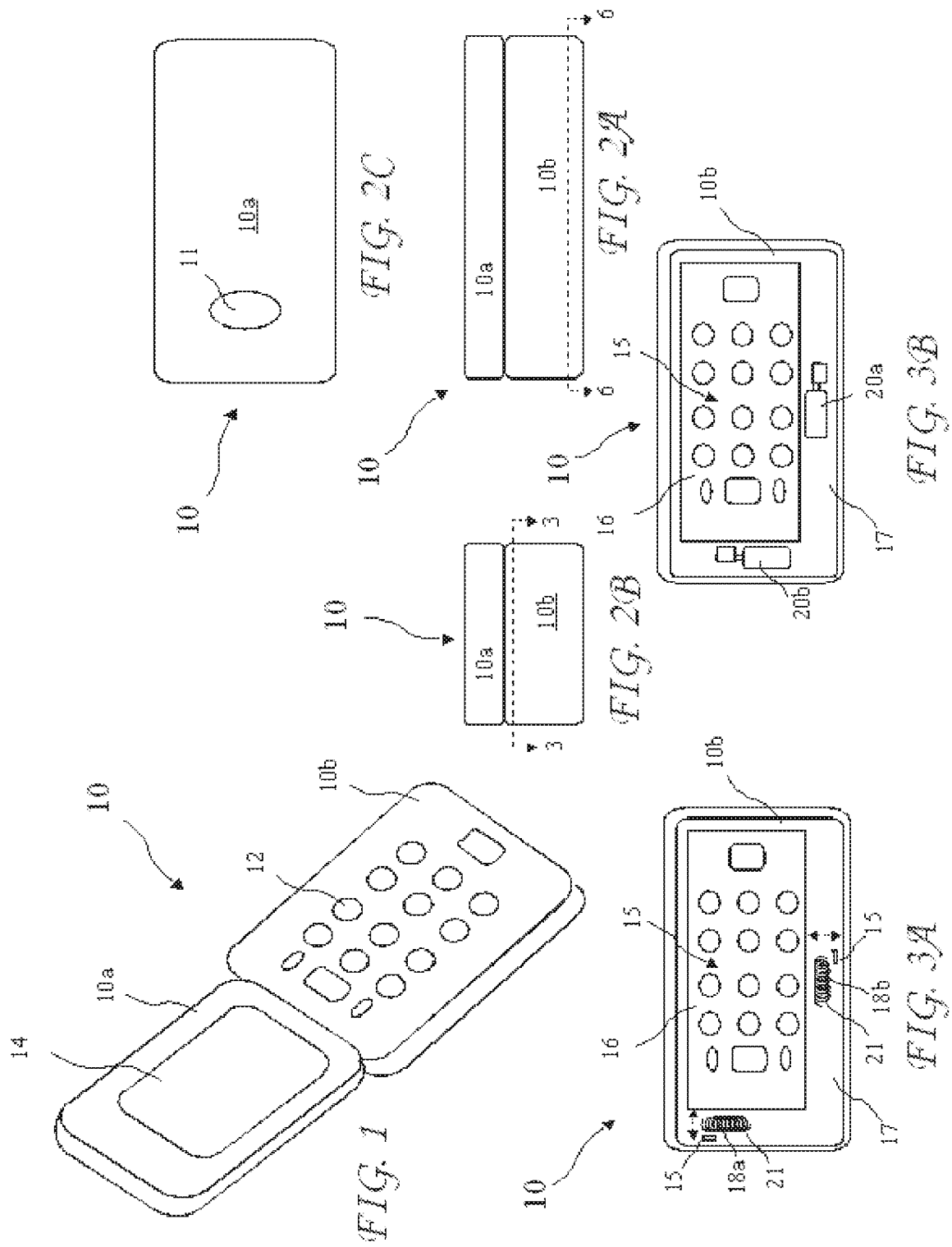

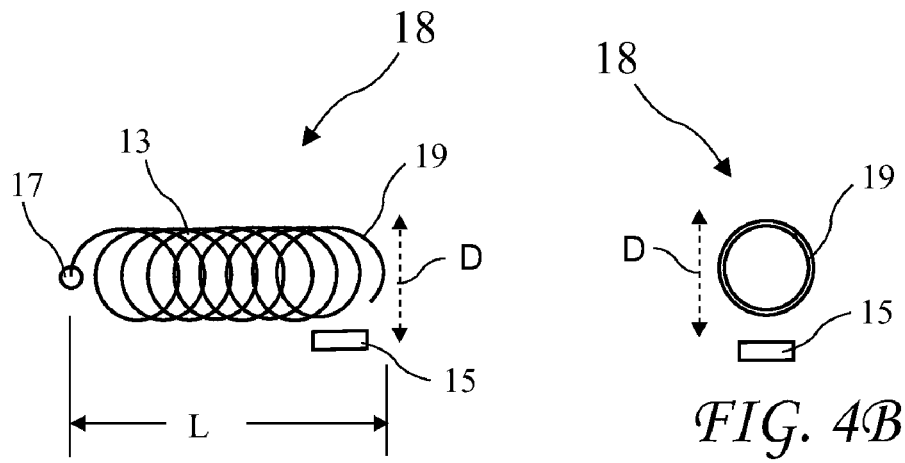
FIG. 4A
FIG. 4B
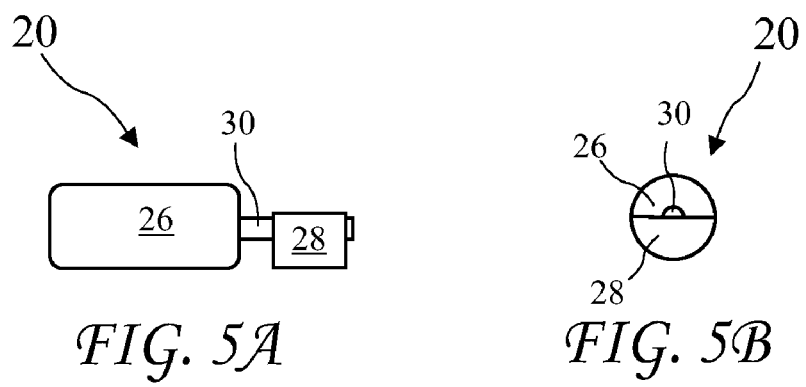
FIG. 5A
FIG. 5B
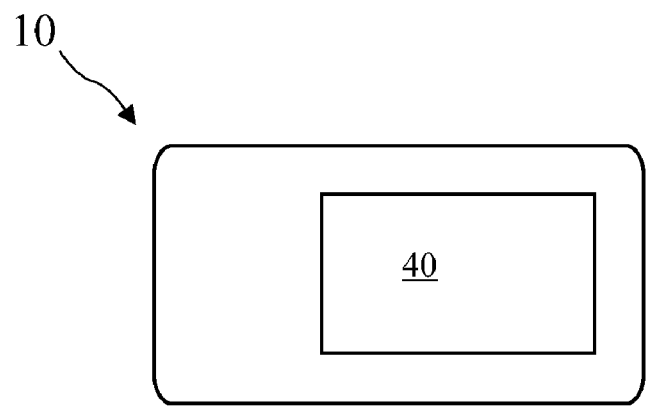
FIG. 6

MOTION ACTIVATED CELL PHONE LIGHTING

BACKGROUND OF THE INVENTION

The present invention relates to cell phones and in particular to motion activation of cell phone functions.

Cell phones have become a common place accessory used by nearly all members of our society. Cell phones have provided tremendous convenience and efficiency by enabling communications from most populated areas in the United States. For example, sales people may now conveniently rearrange schedules, get directions, place or amend urgent orders, while on the road without returning to their offices. Busy parents may likewise keep track of their children, change plans, and the like while on the go.

Unfortunately, much of this communication is performed during other activities, such as driving, and often detracts from a driver's attention to the road and to other vehicles. In dim light or night situations, cell phone keyboard backlighting is provided to allow a cell phone user to see the various keys used to make calls etc. In order to conserve energy stored in the cell phone's battery, the backlighting is generally dimmed or turned off after a brief period of time. Due to the trend to smaller and smaller cell phones, the size of the cell phone battery has been decreased, creating an even greater need to dim or turn off the keyboard backlighting. As a result, the cell phone user often finds herself attempting to press keys or manipulate the cell phone to reactivate the keyboard backlighting, which distraction results in less attention being paid to driving, and creating potentially dangerous situations.

In other instances, a cell phone may be dropped, and again due to the small size, be very difficult to find in low light. It can be particularly difficult to find a dropped cell phone while operating a vehicle, and is a significant safety issue.

U.S. Pat. No. 7,187,952 for "Method of Accepting a Phone Call Based on Motion Properties of the Phone and Related Device" discloses a cell phone with a gyroscope for sensing motion. Unfortunately, the addition of the gyroscope adds complexity and cost to the cell phone. The '952 patent is herein incorporated in it's entirety by reference.

BRIEF SUMMARY OF THE INVENTION

The present invention addresses the above and other needs by providing a cell phone which includes at least one motion switch and circuitry to control cell phone functions when the cell phone is moved. In one embodiment, the motion switch activates keyboard backlighting. A single motion switch may be used or two motion switches may be positioned orthogonally or nearly orthogonally, a first motion switch to activate on motion in a first direction, for example, along the cell phone's length, and a second motion switch to activate on motion in a second direction, for example, along the cell phone's width. One simple and inexpensive motion switch is a cantilevered spring, another is to monitor current produced by a vibrator motor already present in a cell phone. The cell phone according to the present invention with lighting activated by motion switches is particularly useful for locating a dropped cell phone, and even more useful for a vehicle operator searching for a dropped cell phone.

In accordance with one aspect of the invention, there is provided a cell phone including a case, a display residing on a surface of the case for displaying information, a user input keypad residing on a surface of the case for controlling communications functions and initiating phone calls, an electronic circuit inside the case receiving inputs from the keys and performing the communications functions, and a battery electrically connected to the electrical circuit for providing power to the circuit. Keypad and/or display backlighting is commonly provided for facilitating viewing of the keypad and display in low light environments and a vibrator motor is commonly provided for alerting a user to an incoming call. The vibrator motor includes a motor shaft and an off-center mass attached to the motor shaft for generating the vibrations. An electrical signal sensing circuit is connected to the vibrator motor and senses current produced by the vibrator motor when the case in moved, and activates the keypad or display backlighting for a period of time following the motion of the case. The electrical signal sensing circuit may be part of the electrical circuit, or a separate circuit in communication with the electrical circuit.

In accordance with another aspect of the invention, there is provided a cell phone including a case, a keypad residing on a surface of the case for controlling communications functions and initiating phone calls, an electronic circuit inside the case receiving inputs from the keypad and performing the communications functions, a battery electrically connected to the electrical circuit for providing power to the circuit, and at least one motion switch attached to the cell phone for sensing motion of the cell phone. Lighting is connected to the cell phone for facilitating viewing of the cell phone in low light environments, for example, keypad backlighting, display backlighting, or external lighting on the case to facilitate locating a dropped cell phone. An electrical signal sensing circuit is connected to the motion switch and senses a signal from the motion switch when the cell phone is moved and may be part of the electrical circuit, or a separate circuit in communication with the electrical circuit. The electrical signal sensing circuit activates the lighting for a period of time following the motion of the cell phone.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a perspective view of a cell phone with a cover opened.

FIG. 2A is a side view of the cell phone with the cover closed.

FIG. 2B is an end view of the cell phone with the cover closed.

FIG. 2C is a top view of the cell phone with the cover closed.

FIG. 3A is a cross-sectional view of a cell phone according to the present invention including spring motion switches, taken along line 3-3 of FIG. 2B.

FIG. 3B is a cross-sectional view of a second cell phone according to the present invention using vibrating motors as motion switches, taken along line 3-3 of FIG. 2B.

FIG. 4A is a side view of the spring motion switch.

FIG. 4B is an end view of the spring motion switch.

FIG. 5A is a side view of the vibrator motor motion switch.

FIG. 5B is an end view of the vibrator motor motion switch.

FIG. 6 is a cross-sectional view of a cell phone taken along line 6-6 of FIG. 2A showing a cell phone battery.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A perspective view of a cell phone 10 with a cover 10a opened and showing a keypad 12 on a base 10b is shown in FIG. 1. A side view of the cell phone 10 with the cover 10a closed is shown in FIG. 2A, an end view of the cell phone 10 with the cover 10a closed is shown in FIG. 2B, and a top view of the cell phone 10 with the cover 10a closed is shown in FIG. 2C. A cell phone keypad 12 generally includes fifteen or more keys. As the size of cell phones has shrunk, the keys have become both harder to see and to use, and in low light, individual keys are nearly impossible to distinguish. As a result, cell phones generally incorporate backlighting to make the various keys of the keypad 12 more visible to a user. The cell phone cover 10a includes a display 14 which may be difficult to see in low light. In such cases, the display may be a backlit display including backlight to improve viewing in low light situations.

A cross-sectional view of a cell phone 10 including a spring motion switches 18a and/or 18b according to the present invention, taken along line 3-3 of FIG. 2B, is shown in FIG. 3A. The cell phone 10 includes a circuit board 16 for processing ingoing and outgoing signals and keypad strokes, and a least one spring motion switch(s) 18a and/or 18b, all preferably mounted to a base 17. The signals from the spring motion switch(s) 18a and/or 18b may be used to control device functions, for example, activate or re-activating lighting, but is not limited and may activate a call-back, a call to an emergency number, or any cell phone function, and may be set at production, or more preferably, user programable. The signals from the spring motion switch(s) 18a and/or 18b are preferably used to activate or re-active keypad backlighting 15 under or behind the keypad to aid viewing the keypad in low light situations, or to activate external lighting 11 (see FIG. 2C) on the cell phone, thus assisting a user in locating a dropped cell phone. The external lighting 11 may be on the front, back, sides, and/or ends of the cell phone 10. The spring motion switches 18a and/or 18b may alternatively be mounted directly to the circuit board 16.

A cross-sectional view of a second embodiment of the cell phone 10 including vibrating motors used as motion switches 20a and/or 20b according to the present invention, taken along line 3-3 of FIG. 2B, is shown in FIG. 3B. The vibrating motor motion switch(s) 20a and/or 20b are mounted to the base 17 and are used to control cell phone functions as described above for the spring motion switches 18a and/or 18b. The vibrating motor motion switch(s) 20a and/or 20b are preferably used to activate or re-active keypad backlighting 15 or to activate external lighting 11, of the cell phone 10. The vibrating motor motion switches 20a and/or 20b may alternatively be mounted directly to the circuit board 16.

A cell phone described in U.S. Pat. No. 7,187,952 for "Method of Accepting a Phone Call Based on Motion Properties of the Phone and Related Device" discloses a cell phone with a gyroscope for sensing motion. Unfortunately, the addition of the gyroscope adds complexity and cost to the cell phone. Because of rapid advancements in cell phones, the phones have become nearly throw away articles, and such frequent replacement motivates making the phones as inexpensively as possible. Therefore, the incorporation of costly sensors is undesirable.

The motion switches according to the present invention comprise one or more spring motion switches 18 shown in FIGS. 4A and 4B and/or one or more vibrating motors 20 shown in FIGS. 5A and 5B. The spring motion switches 18 preferably include a spring 13 solidly attached at a first end 17 at an attachment point 21 (see FIG. 3) and cantilevered allowing a second (or distal) end 19 to deflect in a direction D perpendicular to a length dimension L of the spring 13 in response to motion of the cell phone base 10b. A contact 15 spaced apart vertically from and proximal to the second end 19, makes electrical contact with the end 19 and provides a signal to the circuit board 16 to activate the cell phone functions. The spring motion switch 18a above the keypad 12 (see FIG. 3) is particularly useful because it is activated by a forward and then stopped motion.

The use of the vibrating motors 20 for motion switches is attractive because such vibrating motors 20 are often present in a cell phone, or other personal device, to alert a user. A common vibrating motor 20 comprises a motor body 26, a motor shaft 30, and an off-center mass 28 attached to the shaft 30. The same vibrating motor 20 which vibrates the cell phone 10 may also be used as a generator to sense motion of the cell phone 10 and generate a signal. In this instance, the circuit board 16 merely monitors the signal from the vibrating motor 20 and actuates the desired function as needed. Such dual use of the vibrating motor 20 already present in the cell phone reduces both cost and size of the cell phone. In one embodiment, a cell phone design already including a vibrating motor 20 may have a single spring switch 18 added to provide two degrees of motion sensing with very little added hardware.

A cross-sectional view of the cell phone 10 taken along line 6-6 of FIG. 2A shows a cell phone battery 40 for providing power to functions actuated by the motion switch(s).

While the invention herein disclosed has been described by means of specific embodiments and applications thereof, numerous modifications and variations could be made thereto by those skilled in the art without departing from the scope of the invention set forth in the claims.

I claim:
1. A cell phone comprising:
a case;
a keypad having keys laid out in rows and in columns residing on a surface of the case for controlling device functions;
an electronic circuit inside the case receiving inputs from the keypad and performing communications functions;
a battery electrically connected to the electronic circuit for providing power to the electronic circuit; and
a motion switch comprising a first motion switch aligned to respond to motion along the columns of the keypad and a second motion switch aligned to respond to motion along the rows of the keypad, the motion switches comprising at least one generator having an off-center mass attached to a generator shaft and motion of the cell phone acts on the off-center mass to cause the generator shaft to rotate and the generator to generate electrical current and provide the electrical current to the electronic circuit, the motion switch providing a non-zero electrical signal to the electronic circuit during motion of the case and providing a zero electrical signal to the electronic circuit when the case is stationary, the motion switch electrically connected to the electronic circuit to control at least one of the device functions.

2. The device of claim 1, wherein one of the at least one generators comprises a vibrator motor provided for alerting a user to an incoming call, and electrical current generated by the vibrator motor is monitored by the electronic circuit to detect motion of the cell phone.

3. The device of claim 1, wherein the device functions include lighting for facilitating viewing of the device in low light environments and the motion switch is electrically connected to the electronic circuit to activate and to re-activate the lighting.

4. The device of claim 3, wherein the lighting is keypad backlighting and the motion switch electrically connected to the circuit to activate and to re-activate the keypad backlighting.

5. A cell phone comprising:
a case;
keys residing on a surface of the case for controlling communications functions and initiating phone calls;
an electronic circuit inside the case for receiving inputs from the keys and for performing the communications functions;
a battery electrically connected to the electronic circuit for providing power to the electronic circuit;
keypad backlighting for facilitating viewing of the keypad in low light environments;
a vibrator motor for alerting a user to an incoming call, the vibrator motor including a motor shaft and an off-center mass attached to the motor shaft, and
an electrical signal sensing circuit connected to the vibrator motor and sensing current produced by the vibrator motor when the cell phone is moved and activating cell phone functions following the motion of the case.

6. The device of claim 5, wherein activating cell phone functions comprises activating the keypad backlighting for a period of time following the motion of the case.

7. The device of claim 5, wherein the cell phone includes a backlit display and activating cell phone functions comprises activating the backlit display for a period of time following the motion of the case.

8. The device of claim 5, wherein the cell phone includes external lighting and activating cell phone functions comprises activating the external lighting for a period of time following the motion of the case.

9. A hand held communications device comprising:
a case;
a keypad residing on a surface of the case for controlling communications functions;
an electronic circuit inside the case receiving inputs from the keypad and performing the communications functions;
a battery electrically connected to the circuit for providing power to the circuit;
lighting for facilitating viewing of the device in low light environments;
a base disposed within the case;
an inertially responsive spring-mass system having a fixed end attached to the base and a free end opposite the fixed end for electrically connecting the lighting during a movement in response to a force acting on the device, wherein the free end moves with respect to the base in response to a force acting on the device and makes an electrical connection switching on the lighting for a period of time.

10. The cell phone of claim 9, wherein the inertially responsive spring-mass system programably activates additional cell phone functions in response to motion of the cell phone.

11. The cell phone of claim 9, wherein the lighting is keypad backlighting.

12. The cell phone of claim 9, wherein the lighting is external backlighting.

13. The cell phone of claim 9, wherein the lighting is a backlit display.

14. A hand held communications device comprising:
a case;
a keypad residing on a surface of the case for controlling device functions;
an electronic circuit inside the case receiving inputs from the keypad and performing communications functions;
a battery electrically connected to the electronic circuit for providing power to the electronic circuit; and
a motion switch providing a non-zero electrical signal to the electronic circuit during motion of the case and providing a zero electrical signal to the electronic circuit when the case is stationary, the motion switch electrically connected to the electronic circuit to control at least one of the device functions, wherein the motion switch comprise a spring having a solidly attached first end and a cantilevered second end opposite the first end and a contact spaced apart laterally from and proximal to the cantilevered second end of the spring, wherein sufficient motion of the hand held communications device causes the cantilevered second end of the spring to deflect in a direction D perpendicular to a length L of the spring and to make an electrical connection with the contact to close a circuit to provide the non-zero electrical signal to the electronic circuit during motion of the case.

15. The device of claim 14, wherein :
the device comprises a cell phone including a cell phone keypad having keys laid out in rows and in columns; and
the motion switch comprises a first motion switch aligned to respond to motion along the columns of the keypad.

16. The device of claim 14, wherein :
the device comprises a cell phone including a cell phone keypad having keys laid out in rows and in columns; and
the motion switch comprises a second motion switch aligned to respond to motion along the rows of the keypad.

* * * * *